(12) United States Patent
Klügl et al.

(10) Patent No.: US 6,194,812 B1
(45) Date of Patent: Feb. 27, 2001

(54) CONTROLLER WITH AN ACTUATOR OF CONTROLLABLE LENGTH AND DEVICE FOR TRANSMITTING THE DEFLECTION OF AN ACTUATOR

(75) Inventors: Wendelin Klügl, Seubersdorf; Hinrich Krüger, Regensburg; Johannes Fitzner, Bernhardswald; Raimondo Giavi, München, all of (DE); Karl Kirchweger, Haidershofen (AT); Jürgen Rink, Wackersdorf (DE); Gerd Schmutzler, Kareth (DE); Stefan Lehmann, Regensburg (DE); Dirk Baranowski, Regensburg (DE); Günter Lewentz, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/281,823

(22) Filed: Mar. 30, 1999

Related U.S. Application Data

(63) Continuation of application No. PCT/DE97/01895, filed on Aug. 29, 1997.

(30) Foreign Application Priority Data

Sep. 30, 1996 (DE) .............................................. 196 40 264

(51) Int. Cl.[7] .................................................. H01L 41/08
(52) U.S. Cl. .......................................... 310/328; 123/446
(58) Field of Search ............................. 310/323.01, 328; 123/446, 467

(56) References Cited

U.S. PATENT DOCUMENTS

| | | | |
|---|---|---|---|
| 3,766,415 | * 10/1973 | Dame et al. | 310/328 |
| 4,765,140 | * 8/1988 | Imoto et al. | 310/328 X |
| 4,767,959 | * 8/1988 | Sakakibara et al. | 310/328 X |
| 4,803,393 | * 2/1989 | Takahashi | 310/328 |
| 4,813,601 | * 3/1989 | Schwerdt et al. | 310/328 X |
| 4,909,440 | * 3/1990 | Mitsuyasu et al. | 310/328 X |
| 5,821,671 | * 10/1998 | Trzmiel | 310/328 |

FOREIGN PATENT DOCUMENTS

| | | |
|---|---|---|
| 37 13 697 A1 | 11/1988 | (DE) . |
| 44 07 962 C1 | 6/1995 | (DE) . |
| 195 43 131 A1 | 10/1996 | (DE) . |
| 0 535 510 A1 | 4/1993 | (EP) . |
| 2 193 386 | 2/1988 | (GB) . |

* cited by examiner

Primary Examiner—Mark O. Budd
(74) Attorney, Agent, or Firm—Herbert L. Lerner; Laurence A. Greenberg; Werner H. Stemer

(57) ABSTRACT

A device for transmitting a deflection of a piezoelectric actuator to a movable tappet includes a pressure chamber between the piezoelectric actuator and the tappet. The pressure chamber is substantially formed by two mutually parallel diaphragms having effective radii of different lengths. The diaphragm with the longer radius is associated with the piezoelectric actuator and the diaphragm with the shorter radius is associated with the tappet. Therefore, upon a deflection of the first diaphragm by the piezoelectric actuator, the second diaphragm is deflected by a greater distance toward the tappet. A controller with an actuator having a controllable length is also provided.

16 Claims, 4 Drawing Sheets

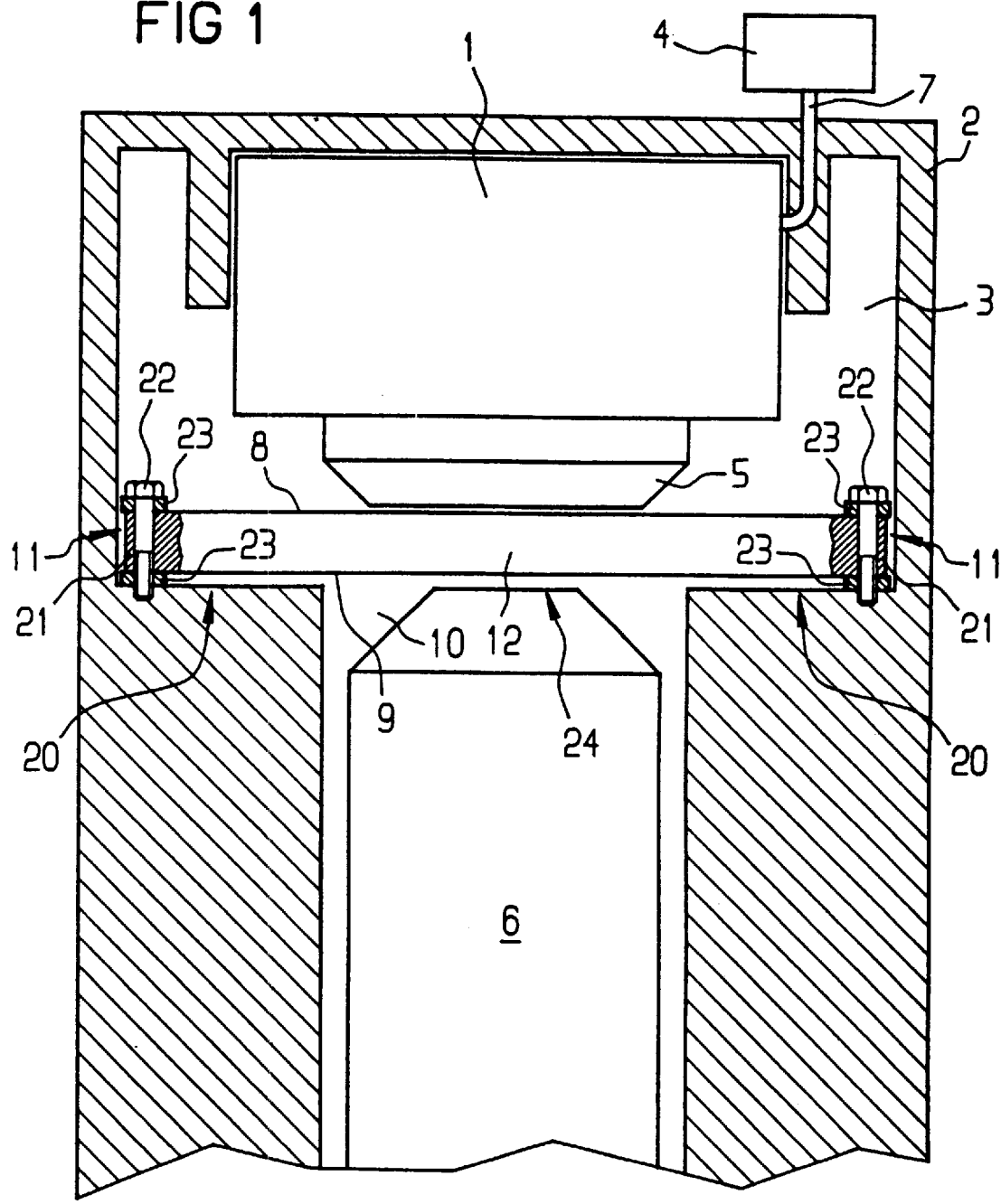

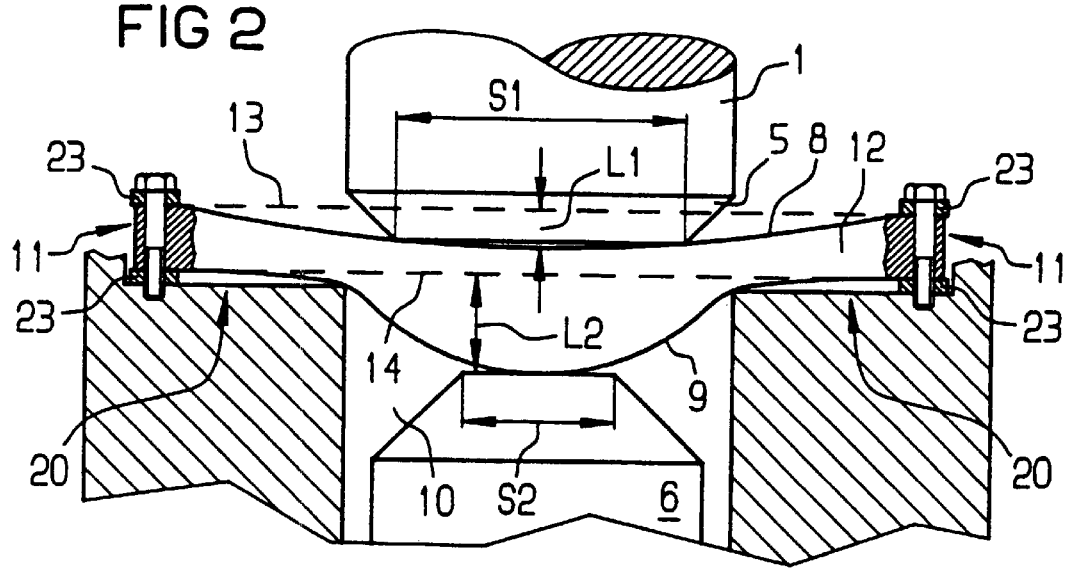
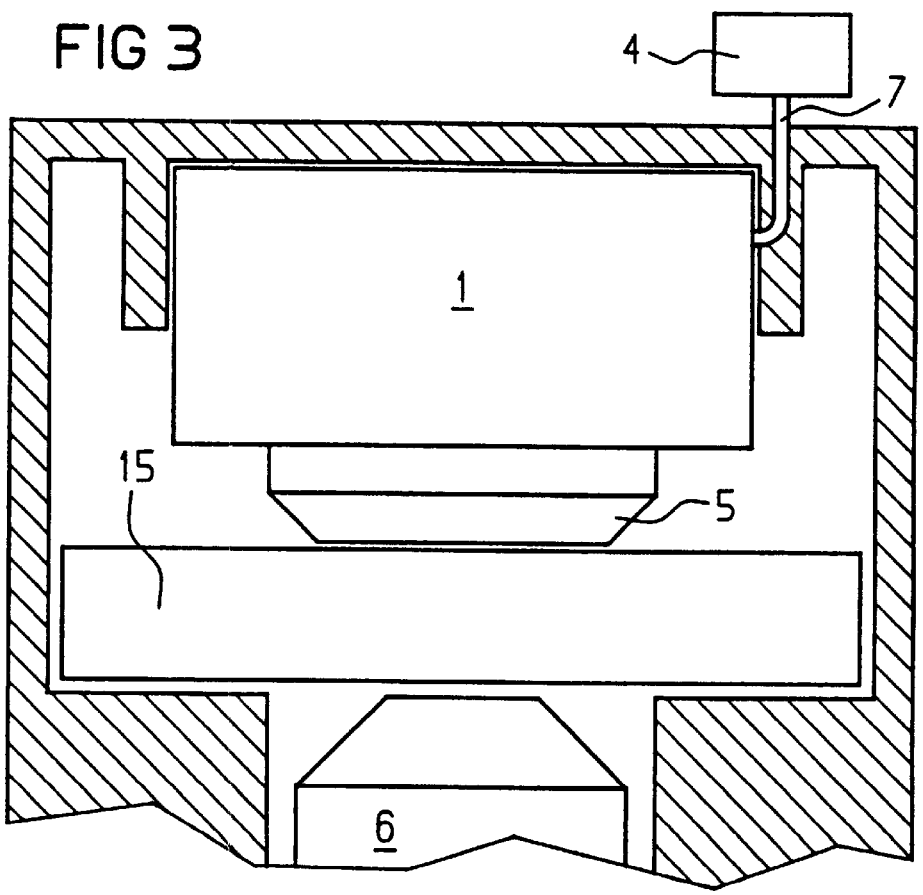

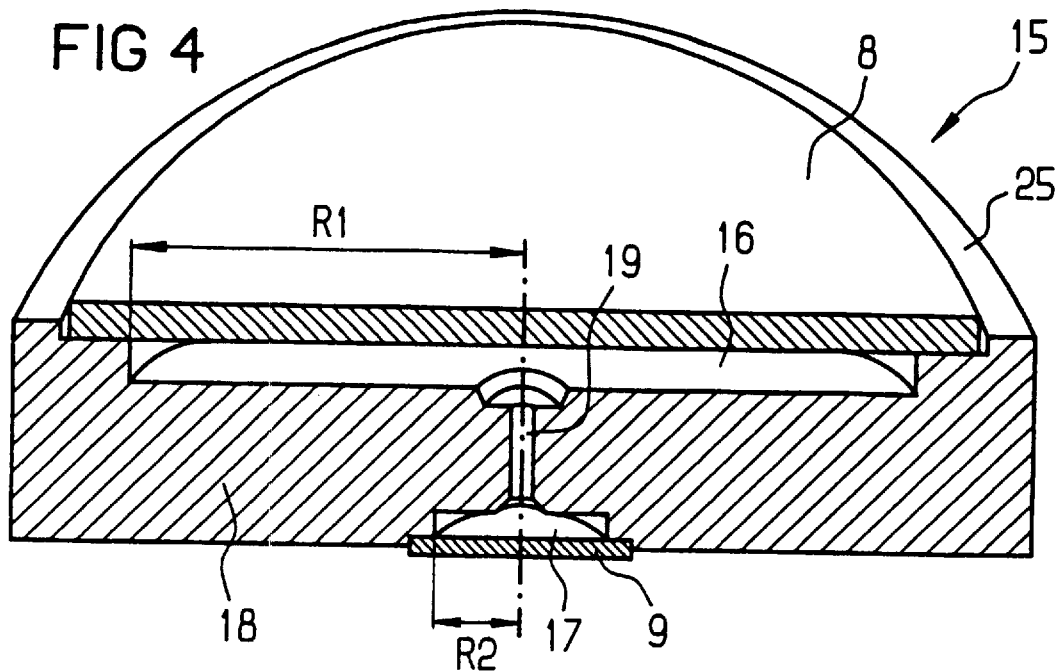
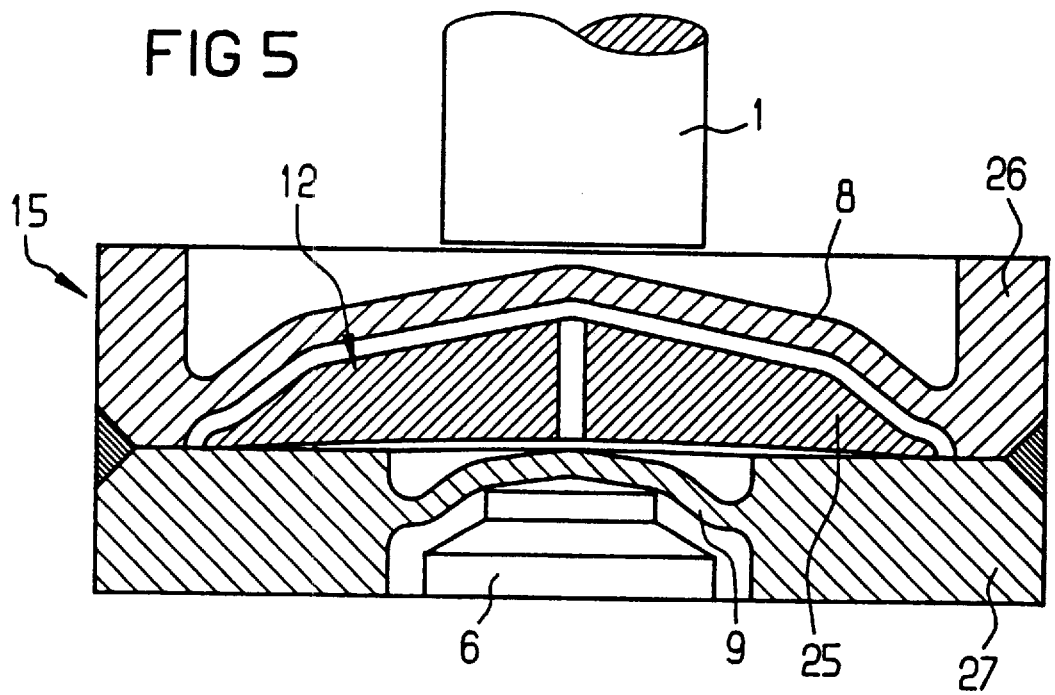

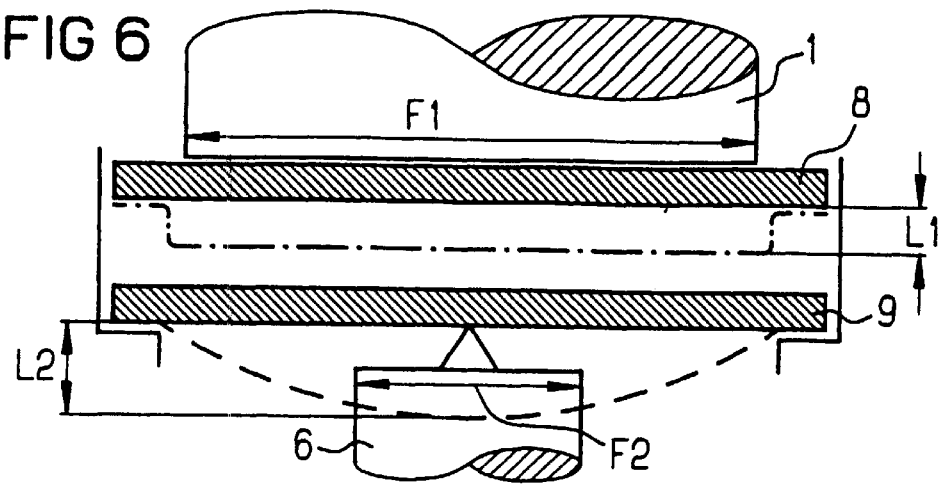
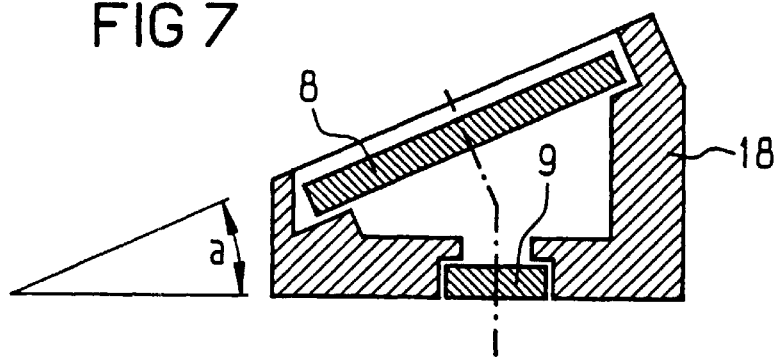
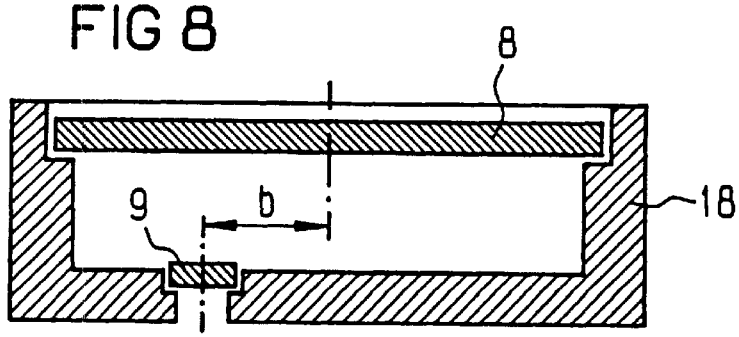

CONTROLLER WITH AN ACTUATOR OF CONTROLLABLE LENGTH AND DEVICE FOR TRANSMITTING THE DEFLECTION OF AN ACTUATOR

CROSS-REFERENCE TO RELATED APPLICATION

This application is a continuation of copending International Application No. PCT/DE97/01895, filed Aug. 29, 1997, which designated the United States.

BACKGROUND OF THE INVENTION

Field of the Invention

The invention relates to a controller with an actuator having a controllable length that is accommodated in a housing. The invention also relates to a device for transmitting a deflection of an actuator, in particular of a piezoelectric actuator.

A controller with a piezoelectric actuator is used in automotive engineering, for instance for opening an injection valve of an internal combustion engine. A longitudinal motion of the piezoelectric actuator is transmitted through a suitable configuration to an associated valve closing member, which relieves a back side of a pressure-loadable nozzle needle and thus enables a targeted opening and closure of the injection nozzle.

A piezoelectric actuator, which is known from UK Patent Application GB 2 193 386 A, rests on a diaphragm that defines a pressure chamber which is filled with hydraulic fluid, along with portions of a valve housing and a tappet disposed movably in a guide bore. The diaphragm protects the piezoelectric actuator from being wetted with the hydraulic fluid. The diaphragm is disposed substantially perpendicular to the direction of deflection of the piezoelectric actuator and is secured laterally in the valve housing.

Another version also protects the tappet against being wetted with the hydraulic fluid. There the pressure chamber is defined by a first bellows, which has a platform-like part on which the piezoelectric actuator rests and which extends substantially perpendicular to the direction of motion of the piezoelectric actuator and is tightly joined to the valve housing. The tappet, which is disposed movably in a guide bore, is also joined to the valve housing by a second bellows, which is disposed perpendicular to the direction of motion of the tappet inside the guide bore. The first bellows and the second bellows form a pressure chamber filled with hydraulic fluid. The piezoelectric actuator, as well as the tappet, are both being protected against being wetted with the hydraulic fluid.

SUMMARY OF THE INVENTION

It is accordingly an object of the invention to provide a controller with an actuator of controllable length and a device for transmitting the deflection of an actuator, which overcome the hereinafore-mentioned disadvantages of the heretofore-known devices of this general type, which transmit the deflection of an actuator to a tappet, in which the tappet and the actuator are protected against being wetted by an operating fluid and in which a defined motion of the tappet in a guide bore is assured.

With the foregoing and other objects in view there is provided, in accordance with the invention, a controller, comprising a housing having a guide conduit; an actuator accommodated in the housing and having a longitudinal direction and a controllable length; a tappet guided in the guide conduit; a pressure chamber disposed between the actuator and the tappet and filled with an operating medium; at least a first and a second diaphragm disposed crosswise to the longitudinal direction of the actuator and defining the pressure chamber; the first diaphragm associated with the actuator and the second diaphragm associated with the tappet, for causing a deflection of the actuator through the first diaphragm, the operating medium and the second diaphragm to lead to a displacement of the tappet; the first and second diaphragms having equal surface areas; the first and second diaphragms having effective surface areas with which the first and second diaphragms are to be deflected; and the effective surface area of the second diaphragm being less than the effective surface area of the first diaphragm; the guide conduit having a given diameter, and the effective surface area of the second diaphragm predetermined by the given diameter.

In accordance with another feature of the invention, the operating medium is under pressure in the pressure chamber, and the first diaphragm permits the operating medium to exert a force on the actuator prestressing the actuator counter to a deflection direction.

In accordance with a further feature of the invention, the operating medium has a coefficient of thermal expansion compensating for different coefficients of thermal expansion of the actuator and the housing.

In accordance with an added feature of the invention, the actuator has a first area operatively connected to the first diaphragm, the tappet has a second area operatively connected to the second diaphragm, and the first area is larger than the second area.

With the objects of the invention in view there is also provided a device for transmitting a deflection of an actuator, in particular a piezoelectric actuator, comprising a substrate part having first and second recesses formed therein; a first diaphragm tightly joined to the substrate part and tightly closing off the first recess; a second diaphragm tightly joined to the substrate part and tightly closing off the second recess; a connecting conduit disposed in the substrate part and interconnecting the first and second recesses; and the first recess, the second recess and the connecting conduit forming a closed pressure chamber filled with an operating medium.

In accordance with another feature of the invention, the first diaphragm has an area defining the first recess, the second diaphragm has an area defining the second recess, and the area of the first diaphragm is larger than the area of the second diaphragm.

In accordance with a further feature of the invention, the second diaphragm has a lesser rigidity than the first diaphragm and sags farther than the first diaphragm under the same pressure.

In accordance with an added feature of the invention, the operating medium in the pressure chamber has a predetermined pressure.

In accordance with an additional feature of the invention, one of the diaphragms is constructed at least in part of fabric-reinforced plastic, in particular an elastomer.

In accordance with a concomitant feature of the invention, there is provided a filler piece which is disposed between the first and second diaphragms and is preferably adapted to a shape of one of the diaphragms, the filler piece permitting the pressure chamber formed by the first and second diaphragms to be constructed with a small volume, regardless of the shape of the first and second diaphragms.

One substantial advantage of the invention is that the tappet in the guide bore is not hindered in its motion by a bellows, and therefore the tappet can be adapted precisely to the dimensions of the guide bore, and as a result canting in the motion of the tappet can be reliably avoided.

It is also advantageous that a compact transmission device is provided which can be manufactured separately from a housing and then mounted in the housing in a simple way.

Other features which are considered as characteristic for the invention are set forth in the appended claims.

Although the invention is illustrated and described herein as embodied in a controller with an actuator of controllable length and a device for transmitting the deflection of an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, sectional view of part of a hydraulic valve;

FIG. 2 is a fragmentary, sectional view of a deflected first and second diaphragm;

FIG. 3 is a fragmentary, sectional view of a part of a hydraulic valve with a transmission device;

FIG. 4 is a sectional view of a transmission device;

FIG. 5 is a sectional view of a pressure chamber with a filler piece;

FIG. 6 is a sectional view of two diaphragms of equal size;

FIG. 7 is a sectional view of two diaphragms inclined relative to one another; and FIG. 8 is a sectional view of two diaphragms laterally offset from one another.

DESCRIPTION OF THE PREFERRED EMBODIMENTS

Referring now to the figures of the drawings in detail and first, particularly, to FIG. 1 thereof, there is seen a diagrammatic representation of part of a hydraulic valve that is used, for instance, to trigger an injection valve. An actuator, in particular a piezoelectric actuator 1, is provided in an actuator chamber 3 of the valve housing 2 and communicates with a trigger device 4 through trigger lines 7. The piezoelectric actuator 1 has a pressure plate 5, which rests on a first diaphragm 8. A second diaphragm 9 is disposed at a predetermined spacing from the first diaphragm 8. The first and second diaphragms 8, 9 are tightly closed off in a peripheral region by a fastening device 11 and at the same time are firmly joined to the valve housing 2 along an annularly encompassing bearing edge 20. The first and second diaphragms 8, 9 define a pressure chamber 12, which is filled with a liquid or paste-like operating medium, that is preferably at a predetermined pressure. The first and second diaphragms 8, 9 are constructed, for instance, as circular spring steel plates. The first diaphragm 8 preferably has a greater spring stiffness than the second diaphragm 9.

A spacer ring 21 which is provided in the peripheral region of the first and second diaphragms 8, 9 extends all the way around between the first and second diaphragms 8, 9. The spacer ring 21 predetermines the spacing between the first and second diaphragms 8, 9. The first and second diaphragms 8, 9 are tightly pressed against the spacer ring 21 through screws 22 and annular cover plates 23, so that the pressure chamber 12 is tightly closed off.

The tight connection between the first and second diaphragms 8, 9, or the firm connection between the first and second diaphragms and the valve housing 2, can be constructed by way of example as a screw, clamp or welded structure.

A guide conduit 10 which is constructed, for instance, as a guide bore 10, is made in the valve housing 2, preferably symmetrically to the disposition of the piezoelectric actuator 1. The guide bore 10 is guided as far as the second diaphragm 9 and discharges into the actuator chamber 3. A tappet 6 that is movable longitudinally of the guide bore 10 is installed in the guide bore 10. The tappet 6 has an upper pressure surface 24 that is associated with the second diaphragm 9 and preferably rests on the second diaphragm 9. The tappet 6 is a movable part, to which the motion of the actuator 1 is transmitted. The tappet 6 is operatively connected to a closing member, which relieves a back chamber of an injection needle of pressure as a function of the position of the tappet 6. As a result, the injection needle is lifted from an associated valve seat, and an injection event begins.

The operating medium located in the pressure chamber 12 preferably has the least possible compressibility, which is true, for instance, for a suitable hydraulic oil. It is also advantageous to use an operating medium with a high coefficient of thermal expansion, to enable compensating for the different coefficients of thermal expansion of the valve housing 2 and the actuator 1. Filling the pressure chamber 12 with an operating medium that is at a predetermined pressure offers the advantage of averting discontinuities in the operating medium, such as gas bubbles, and thus assuring a direct, loss-free transmission of pressure from the pressure plate 5 to the second diaphragm 9. An operating medium that is under pressure also offers the advantage of prestressing the first diaphragm 8 in the direction toward the actuator 1, so that a further spring for prestressing the actuator 1 can be dispensed with.

The function of the configuration in FIG. 1 will be described in further detail below in conjunction with FIG. 2. FIG. 2 shows a piezoelectric actuator 1 which is lengthened by a first distance L1 toward the first diaphragm 8. Deflection of the actuator 1 presses the first diaphragm 8 toward the tappet 6, so that the first diaphragm 8 is made to sag toward the tappet 6. In FIG. 2, an outset or initial position 13 of the first diaphragm 8, which corresponds to the position of the first diaphragm 8 in FIG. 1, and an outset or initial position 14 of the second diaphragm 9, which corresponds to the position of the second diaphragm 9 in FIG. 1, are shown in dashed lines.

Since the pressure chamber 12 is filled with an operating medium that has low compressibility, the deflection of the first diaphragm 8 deflects the second diaphragm 9 toward the tappet 6 by a second distance L2, so that the tappet 6 is moved away from the piezoelectric actuator 1 by this second distance L2.

The second diaphragm 9 cannot deflect over its entire surface area, because the second diaphragm 9 rests in its peripheral region on the bearing edge 20. The effective surface area over which the second diaphragm 9 can deflect is predetermined by the cross section of the guide bore 10. Since the guide bore 10 is circular in cross section, the effective radius will be considered below instead of the effective surface area, over which the second diaphragm can be deflected, since the effective surface area is proportional to the effective radius. The area with which the second diaphragm 9 can be deflected is smaller than the area with which the first diaphragm 8 is deflected. The second distance L2 is correspondingly longer than the first distance L1, since the volume of the operating medium displaced by the first diaphragm 8 is compensated for by the deflection of the second diaphragm 9, if the operating medium is incompressible.

The ratio between the first deflection L1 and the second deflection L2 is a function, among others, of the deflectable area of the first diaphragm 8, and the deflectable area of the second diaphragm 9. In the exemplary embodiment described, the first and second diaphragms 8, 9 have a circular area, and thus the deflectable area of the first and second diaphragms 8, 9 is respectively proportional to the effective diameter of the first and second diaphragms. Thus the ratio of the first deflection L1 to the second deflection L2 is proportional to the ratio of a second effective diameter D2 to a first effective diameter D1.

In FIG. 1 and FIG. 2, the effective diameter D1 of the first diaphragm 8 corresponds to the actual diameter of the first diaphragm 8, and the effective diameter D2 of the second diaphragm 9 corresponds to the diameter of the guide bore 10, which is smaller than the actual diameter D1 of the first diaphragm 8. Since the effective diameter of the second diaphragm 9 is shorter than the effective diameter of the first diaphragm 8, a slight deflection of the piezoelectric actuator 1 is converted into a greater deflection of the tappet 6.

The ratio of the first deflection to the second deflection is also a function of the diameters of the areas with which the pressure plate 5 and the tappet 6 rest on the first and second diaphragms 8, 9, respectively. The pressure plate 5 and the tappet 6 each have a respective circular area, resting on the first and second diaphragms, with a respective first diameter S1 and second diameter S2. As a result, the bending line of the respective first and second diaphragms 8, 9 is at least partly predetermined by the pressure plate 5 and the tappet 6, and thus also influences the deflection L1, L2 of the respective first and second diaphragms 8, 9. The ratio of the first diameter S1 of the pressure plate 5 to the second diameter S2 of the tappet 6 is proportional to the ratio of the second deflection L2 of the second diaphragm 9 to the first deflection L1 of the first diaphragm 8.

A preferred embodiment of the first and second diaphragms 8, 9 includes making the first and second diaphragms 8, 9 at least in part of a cloth-reinforced plastic, preferably an elastomer.

FIG. 3 shows a diagrammatic layout of a further essential embodiment of the invention, in which the transmission of the deflection of the actuator 1 to the tappet 6 is represented in the form of an integral transmission device 15, which rests on the bearing edge 20 of the valve housing 2 between the pressure plate 5 and the tappet 6. The essential layout of FIG. 3 corresponds to the layout of FIG. 1, so that below, only the transmission device 15 will be described in detail, in conjunction with FIG. 4.

FIG. 4 shows an integral transmission device 15 in cross section, which has a disk-like substrate part 18 made of metal, out of which a first, disk-like recess 16 is machined from the top inward. An annularly encompassing rib 25 laterally defines the first recess 16. The first diaphragm 8 is disposed above the recess 16 and is tightly joined on the periphery to the rib 25.

A second recess 17 is made in the substrate part 18 from the underside and is tightly closed off with the second diaphragm 9. The second diaphragm 9 is tightly joined to the substrate part 18 on an annularly encompassing surface. The first and second recesses 16, 17 are joined together through a connecting line 19 made in the substrate part 18 and thus form a closed-off pressure chamber 12.

The first and second diaphragms 8, 9 are preferably constructed circularly. The area or a radius R1 of the first diaphragm 8 is greater than the area or a radius R2 of the second diaphragm 9.

The spring stiffness of the second diaphragm 9 is preferably less than the spring stiffness of the first diaphragm 8. Therefore, for an available, limited force of the actuator 1, a correspondingly great second deflection L2 of the second diaphragm 9 is generated when the first diaphragm 8 is deflected toward the first recess 16 by the piezoelectric actuator 1.

The volume in the pressure chamber 12 between the two diaphragms 8, 9 should be as small as possible, in order to achieve a high hydraulic rigidity.

It is also advantageous to provide the operating medium in the pressure chamber 12 with a predetermined pressure, so that the first and second diaphragms 8, 9 curve toward the piezoelectric actuator 1 and the tappet 6, respectively, and thus the actuator 1 and the tappet 6 are correspondingly prestressed. Therefore, no additional springs for prestressing the actuator 1, in particular, are necessary. The configuration of FIG. 4 functions in accordance with the principle of FIG. 2. A slight deflection of the first diaphragm 8, because of the long radius R1, forces a large volume of operating medium from the first recess 16 into the second recess 17 through the connecting line 19. The second diaphragm 9 is correspondingly deflected farther, since the radius R2 of the second diaphragm 9 is shorter than the radius R1 of the first diaphragm 8.

The diameter of the connecting line 19 should preferably be dimensioned in such a way that no impairing throttling action occurs when the operating medium is forced through the connecting line 9.

The step-up transmission device 15 of FIG. 4 offers the particular advantage of requiring only a little assembly effort to install it in the valve housing 2, since the step-up device 15 has already been preassembled in final form. Nor does any leakage occur because of the device of the invention, and thus maximum possible efficiency is achieved in the step-up of the deflection of the piezoelectric actuator 1 to the tappet 6.

In addition, a high hydraulic rigidity is attained because of the special shape of the first and second diaphragms 8, 9, which are plates disposed substantially perpendicular to the direction of deflection of the piezoelectric actuator or drive 1.

FIG. 5 is a cross-sectional view which shows the layout of an optimized-tension transmission device 15, in which the first and second diaphragms 8, 9 are curved toward the actuator 1 and prestressed thereby. The first and second diaphragms 8, 9 each have a respective, encompassing, reinforced support ring 26, 27, beginning at which the respective first and second diaphragms 8, 9 are formed. Therefore, the respective first and second diaphragms 8, 9 with the corresponding support ring 26, 27 are each formed as a single component. The diameter of the corresponding diaphragm 8, 9 is defined by the corresponding width of the support ring 26, 27. The connection between the first and second diaphragms is made between the support rings 26, 27, which by way of example are tightly screwed together or adhesively bonded to one another. This assures that the connection between the first and second diaphragms 8, 9 is made outside the diaphragm 8, 9 and outside the region in which the respective diaphragm 8, 9 adjoins the support ring 26, 27.

A filler piece 25 which is preferably installed in the pressure chamber 12 preferably emulates the pressure chamber 12 and fills up part of the pressure chamber 12. The connecting line 19 is also preferably made in the filler piece 12. Preferably, the filler piece 12 is fixedly disposed in the pressure chamber 12 and divides the pressure chamber 12 into two chambers. One chamber is defined at least partly by the first diaphragm 8 and the second chamber is defined at least partly by the second diaphragm 9. The filler piece 25 is manufactured from an incompressible material, preferably metal.

Due to the installation of the filler piece, the geometry of the first and second diaphragms 8, 9 is made independent of the requirement that the pressure chamber 12 be constructed with as small a size as possible, so that the compressibility between the first and second diaphragms 8, 9 can be kept as slight as possible. In this way, the first and second diaphragms 8, 9 can be constructed with optimized tension. The pressure chamber 12 is preferably made from three separately produced parts. A first part has the first diaphragm 8, a second part has the second diaphragm 9, and a third part has the filler piece 25.

The filler piece 25 is preferably constructed in such a way that it approximately emulates the curvature of the first and/or the second diaphragm 8, 9, but a corresponding spacing is provided between the filler piece 25 and the first or second diaphragm so that the deflection of the first and second diaphragms 8, 9 is not hindered. The first diaphragm 8, the second diaphragm 9 and the filler piece 25 are each produced separately and then joined to one another.

A preferred method for producing the step-up device 15 is metal injection molding, using a mixture of powered metal and up to 50% plastic. Through the use of this method, many different shapes and geometries of the step-up device 15 can be produced.

A preferred material for producing the step-up device 15 is a fiber-reinforced material, preferably fiber-reinforced plastic, which is shaped accordingly.

FIG. 6 diagrammatically shows a preferred embodiment, in which the first and second diaphragms 8, 9 are selected to be of the same size, but the surfaces with which the actuator 1 and the tappet 6 respectively rest on the first and second diaphragms 8, 9 are of different sizes. The actuator 1 has a larger deflection surface F1 and the tappet 6 has a smaller deflection surface F2. Therefore, because of the larger surface F1, with which the actuator 1 deflects the first diaphragm 8 by a first distance L1, the second diaphragm 9 is deflected by a greater second distance L2, so that a step-up in the deflection of the actuator 1 on the tappet 6 is attained through the differently-sized first and second surfaces F1, F2.

FIG. 7 shows a further embodiment, in which the second diaphragm 9 is not constructed parallel to the first diaphragm 8. Thus, a deflection in the direction of motion of the actuator 1 to an arbitrary direction of motion of the tappet 6 is possible, even though the first and second diaphragms 8, 9 are preferably flat, plate-like diaphragms 8, 9. The second diaphragm 9 can be oriented at an arbitrary angle "a" relative to the first diaphragm 8.

FIG. 8 shows a further feature of the invention, in which the first and second diaphragms 8, 9 are parallel to one another and are offset laterally from one another by a distance "b", so that the deflection direction of the actuator 1 and the direction of motion of the tappet 6 are parallel to and laterally offset from one another.

We claim:

1. A controller, comprising:
   a housing having a guide conduit;
   an actuator accommodated in said housing and having a longitudinal direction and a controllable length;
   a tappet guided in said guide conduit;
   a pressure chamber disposed between said actuator and said tappet and filled with an operating medium;
   at least a first and a second diaphragm disposed crosswise to said longitudinal direction of said actuator and defining said pressure chamber;
   said first diaphragm associated with said actuator and said second diaphragm associated with said tappet, for causing a deflection of said actuator through said first diaphragm, said operating medium and said second diaphragm to lead to a displacement of said tappet;
   said first and second diaphragms having equal surface areas;
   said first and second diaphragms having effective working surface areas defined by surface area deflected in said first and second diaphragms; and
   said effective working surface area of said second diaphragm being less than said effective working surface area of said first diaphragm.

2. The controller according to claim 1, wherein said guide conduit has a given diameter, and said effective surface area of said second diaphragm is predetermined by said given diameter.

3. The controller according to claim 1, wherein said operating medium is under pressure in said pressure chamber, and said first diaphragm permits said operating medium to exert a force on said actuator prestressing said actuator counter to a deflection direction.

4. The controller according to claim 1, wherein said operating medium has a coefficient of thermal expansion compensating for different coefficients of thermal expansion of said actuator and said housing.

5. The controller according to claim 1, wherein said actuator has a first area operatively connected to said first diaphragm, said tappet has a second area operatively connected to said second diaphragm, and said first area is larger than said second area.

6. A device for transmitting a deflection of an actuator, comprising:
   a substrate part having first and second recesses formed therein;
   a first diaphragm tightly joined to said substrate part and tightly closing off said first recess;
   a second diaphragm tightly joined to said substrate part and tightly closing off said second recess;
   a connecting conduit disposed in said substrate part and interconnecting said first and second recesses; and
   said first recess, said second recess and said connecting conduit forming a closed pressure chamber filled with an operating medium.

7. The device according to claim 6, wherein said first diaphragm has an area defining said first recess, said second diaphragm has an area defining said second recess, and said area of said first diaphragm is larger than said area of said second diaphragm.

8. The device according to claim 6, wherein said second diaphragm has a lesser rigidity than said first diaphragm and sags farther than said first diaphragm under the same pressure.

9. The device according to claim 6, wherein said operating medium in said pressure chamber has a predetermined pressure.

10. The device according to claim 6, wherein one of said diaphragms is constructed at least in part of fabric-reinforced plastic.

11. The device according to claim 10, wherein said fabric-reinforced plastic is an elastomer.

12. The device according to claim 6, including a filler piece disposed between said first and second diaphragms, said filler piece permitting said pressure chamber formed by said first and second diaphragms to be constructed with a small volume, regardless of the shape of said first and second diaphragms.

13. The device according to claim 12, wherein said filler piece is adapted to a shape of one of said diaphragms.

14. The controller according to claim 1, including a filler piece disposed between said first and second diaphragms, said filler piece permitting said pressure chamber formed by said first and second diaphragms to be constructed with a small volume, regardless of the shape of said first and second diaphragms.

15. The controller according to claim 14, wherein said filler piece is adapted to a shape of one of said diaphragms.

16. A device for transmitting a deflection of a piezoelectric actuator, comprising:

a substrate part having first and second recesses formed therein;

a first diaphragm tightly joined to said substrate part and tightly closing off said first recess;

a second diaphragm tightly joined to said substrate part and tightly closing off said second recess;

a connecting conduit disposed in said substrate part and interconnecting said first and second recesses; and said first recess, said second recess and said connecting conduit forming a closed pressure chamber filled with an operating medium.

\* \* \* \* \*